United States Patent [19]
Blonder

[11] 3,813,482

[45] May 28, 1974

[54] METHOD OF AND APPARATUS FOR SCRAMBLE-ENCODED TRANSMISSION AND DECODED RECEPTION FOR OVER THE AIR AND CABLE SUBSCRIPTION TELEVISION AND THE LIKE

[75] Inventor: Isaac S. Blonder, Locust, N.J.

[73] Assignee: Blonder-Tongue Laboratories Inc., Old Bridge, N.J.

[22] Filed: July 24, 1972

[21] Appl. No.: 274,199

[52] U.S. Cl. .......................... 178/5.1, 178/DIG. 13
[51] Int. Cl. .......................................... H04n 1/44
[58] Field of Search ...................... 178/5.1, DIG. 13

[56] References Cited

UNITED STATES PATENTS 3,081,376 3/1963 Loughlin et al. .................... 178/5.1
3,184,537 5/1965 Court et al. ......................... 178/5.1
3,679,813 7/1972 Banning, Jr. ......................... 178/5.1

*Primary Examiner*—Maynard R. Wilbur
*Assistant Examiner*—S. C. Buczinski
*Attorney, Agent, or Firm*—Rines & Rines; Shapiro & Shapiro

[57] ABSTRACT

This disclosure deals with novel television or similar scrambling-decoding techniques for use in subscription television and the like (STV), involving the transmission of picture signals scrambled by repetitively depressing to blanking level a plurality of sync signals, preferably the vertical, and at about a 10 Hz rate in order to produce a shifting rolling picture, psychologically unpleasant and discomforting to the viewer, while displacing the audio program signals to a superaudible subcarrier and substituting a barker channel in the normal aural band—all without affecting the video signals; such that, upon reception, decoding and picture and sound restoration, the reception quality, even for color, remains unchanged.

53 Claims, 2 Drawing Figures

Figure 1:
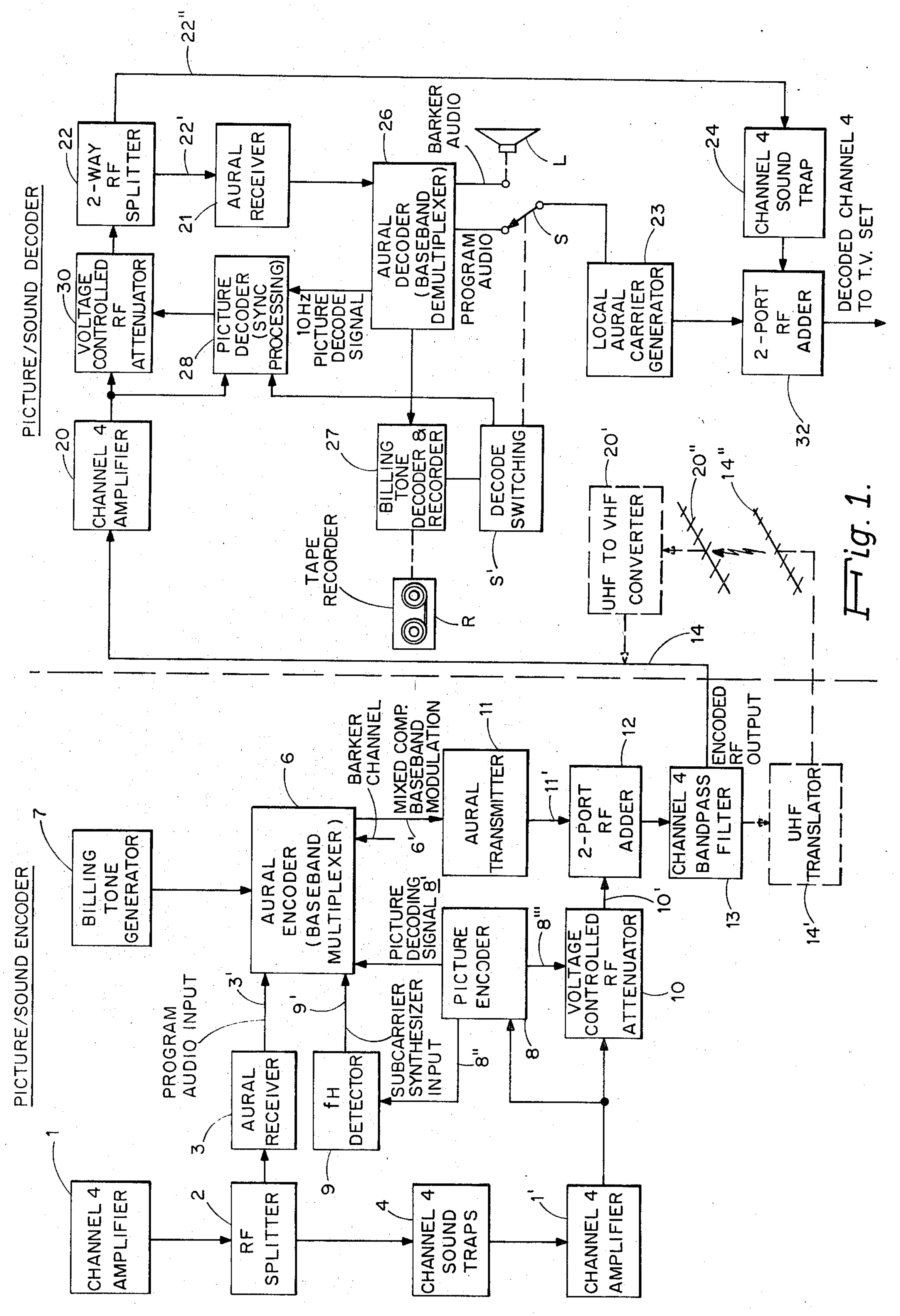

METHOD OF AND APPARATUS FOR SCRAMBLE-ENCODED TRANSMISSION AND DECODED RECEPTION FOR OVER THE AIR AND CABLE SUBSCRIPTION TELEVISION AND THE LIKE

The present invention relates particularly to the transmission and reception and decoding of scrambled television signals and the like, being more particularly directed to new and improved systems and methods for producing such reception and decoding, such as for subscription television (STV) and related purposes.

There have been numerous proposals over the years for enabling the transmission (as through the air) of television and other communication signals which are sufficiently scrambled that an unauthorized receiver cannot make effective use of the intelligence; while an authorized (suitably equipped) receiver can decode the scrambling and thus recover the intelligence. Of later years, attention has been directed in the context of subscription television and the like. A typical proposal involves delaying the horizontal picture line by as much as 5 percent, usually switching the same in blocks of lines with the patterns varied from time to time. Problems with this technique reside not only in the cost and the difficulty of providing identical delay lines for both the transmitter and the receiver, but in the difficulty of maintaining color picture quality in the remodulation required after decoding. This is vital because, under the present governmental rules and regulations (FCC) with regard to subscription television service, it is a requirement that the signal ultimately provided at the subscriber's receiver (1) must comply with all of the technical standards for color transmission and accompanying audio signals, (2) must be of precisely the same quality as the regular television signals received in that area, and (3) must require no internal modification of the subscriber's receiver.

Another approach to coding the television picture is synchronously to attenuate the horizontal and vertical pulses while the original signal is still in radio frequency form; and, as the decoder restores these pulses, by increasingly modulating the attenuator. Again, however, it is most difficult, particularly in the case of color reproduction, to meet the FCC requirements, above, with economically feasible equipment. Systems using multiplexing scrambling by removing horizontal and vertical sync pulses, such as described in U.S. Pat. No. 3,530,232, are subject, furthermore, to the locking of the horizontal and vertical afc circuits on spurious transients, as well. Other proposals have also been made for introducing spurious signals into the television picture to disguise or distort (scramble) the information, but with these very same practical problems.

In U.S. Pat. No. 3,069,492, issued Dec. 18, 1966, to the present assignee, Blonder-Tongue Laboratories, Inc., as another illustration, a novel type of scrambling and unscrambling of television pictures wellsuited to black and white television is disclosed, employing two-picture modulation. The additional requirements of color and high picture quality, however, are not yet achievable with this technique. Similar remarks apply to U.S. Pat. No. 3,175,033, issued Mar. 23, 1965, dealing with filtering the video signal and the effects upon the received transmission; but, while perfectly useable in its application to black and white over-the-air transmission decoding, it requires the regeneration of video carrier with a degree of precision that is not presently practically attainable in color systems.

Still other proposals to remove horizontal sync and replace with a sinusoidal key signal, involve highly critical phase relationship restoration at the receiver, also, as described in U.S. Pat. No. 3,116,363. Again, practical realization with economically feasible equipment for subscription television purposes and the like, has not been achievable.

In accordance with the present invention, on the other hand, a vitally different approach is followed; it being an object of the invention to provide a new and improved method of and apparatus for scramble-encoded transmission and decoded reception for over-the-air or cable subscription television and the like that avoid the prior-art problems of difficult, critical and costly phase and other signal relationship restoration, as well as picture quality degradation. The picture signal is left as it is, under the technique of the invention and, in summary, a plurality of sync signals (preferably the vertical) is repetitively depressed to blanking level between similar pluralities of normal level sync signals, and at about 10 Hz rate in order to produce a shifting or rolling scrambled picture, psychologically unpleasant and discomforting to the viewer, while displacing the audio program signals to a super-audible subcarrier and substituting a barker channel in the normal aural band—all without affecting or altering the video picture signals; such that, upon reception, decoding and picture and sound restoration, the reception quality, even for color, remains unchanged over that obtained in unscrambled transmission and reception. Preferred details and auxiliary systems for enabling billing information recording are hereinafter set forth.

A further object of the invention is to provide such a novel method and apparatus that are particularly adapted for use with a myriad of billing-recording systems required for STV and the like.

Still another object is to provide, through the barker channel facility, adaptability for stereo signals, simultaneous language translation signals, and other multisignal applications.

An additional object is to provide a novel encoding and scrambling transmission system and method.

A further objective is the provision of a new and improved receiving and decoding apparatus and technique.

Further objects include novel barker channel apparatus, and novel billing-recording techniques; and additional objects of the invention will be explained hereinafter, being more particularly delineated in the appended claims.

Figure 3:
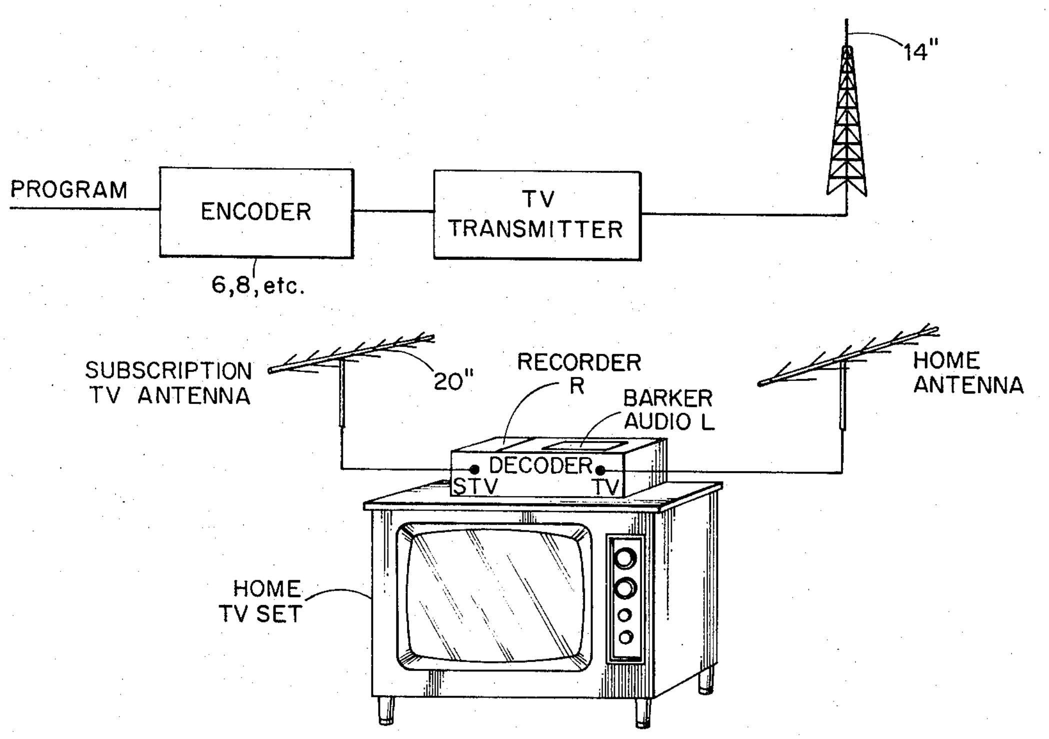
Figure 2:
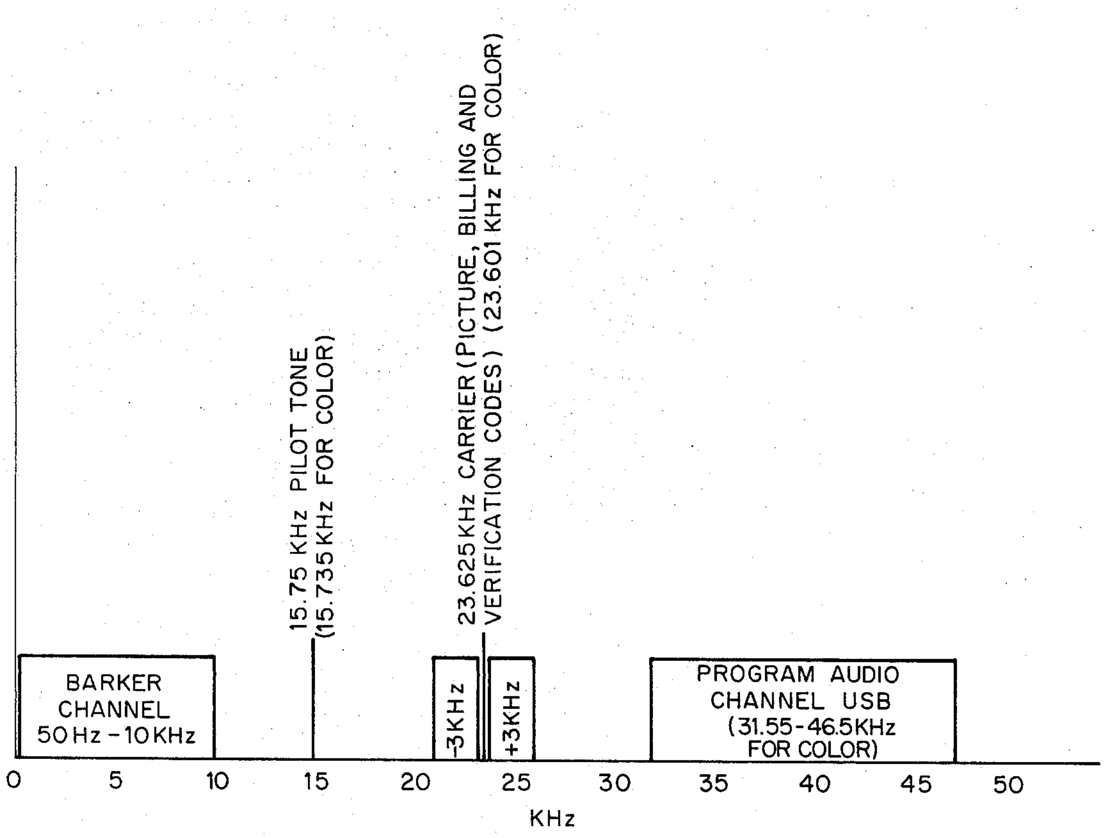

The invention will now be described with reference to the accompanying drawings, FIG. 1 of which is a block diagram of a preferred form of transmission encoding and scrambling, and reception decoding, employing the novel methods of the invention;

FIG. 2 is a spectrum chart illustrating an aural baseband spectrum useful in the system of FIG. 1; and FIG. 3 is a generalized block diagram illustrating an over-all transmitter-receiver system embodying the invention.

Referring to FIG. 1, and considering, first, the encoding at the television transmitting station, this is illustrated in connection with an actual installation used for test, closed-system and demonstration purposes. While it will be understood that the encoding, in normal practice, will be effected as hereinafter explained at the transmitter itself, the production of a quasi-transmitter signal may be attained by using a received signal as the intended transmitter signal and scrambling and otherwise processing the same as a substitute transmitter that is particularly useful for test and demonstration purposes; a so-called "off the air" picture-sound encoder. Among the advantages of such an "off the air" encoder are freedom of hardward location and assurance that the radiated signal (RF and baseband) complies with all pertinent government (FCC) regulations. It is to be understood, however, that in other than such test, closed-system and demonstration and similar uses, the same encoding circuits will be applied at the actual transmitter circuit itself, as shown in FIG. 3.

The signal of VHF channel 4, for example, (New York City) is illustratively shown in FIG. 1 as amplified at 1 and applied via a two-way rf splitter 2 to an aural receiver 3 and a channel 4 sound trap 4. The aural receiver 3 is essentially an ultra low-distortion wideband frequency-modulation receiver using the 4.5 MHz intercarrier frequency for its intermediate frequency, and its output is processed for recovery of the program audio (50 Hz–15 KHz). When an actual transmitter is used, FIG. 3, as distinguished from this "off the air" quasi-transmitter, of course, the program audio is readily available. It is shown applied at 3' to a baseband multiplexer aural encoder circuit 6 which synthesizes four channels of baseband and information; namely, a barker channel, a pilot tone (such as 15.75 KHz), the video decoding and billing tone channel, and the program audio channel. The program audio input, as beforementioned, is shown applied at 3'. A billing tone input is derived from a suitable generator 7 and may produce by double side-band AM modulation (FIG. 2), for example, 30 Hz square-wave signals for video decoding billing code tones and monthly verification tones identifying the programs and their duration of transmission. The picture decoding input and a superaudible subcarrier synthesizer input (preferably, say, 31.5 KHz, twice the pilot tone horizontal sync frequency fH) are applied, respectively, at 8' and 9' and are derived from a second channel 4 amplifier 1', fed from the sound traps 4, as follows. The signal applied to the amplifier 1', is devoid of all sound information since only picture encoding is hereinvolved. The picture encoder 8 is a sync processor comprising a sync separator-noise blanker and coding logic, and is used with a voltage controlled rf attenuator 10, operating solely on sync information and in no way altering the video content of the "off the air" or other signal. The encoder 8 is shown applying a picture decoding signal output along 8' to the aural encoder 6; and an output 8'' to an fH detector 9 for producing the subcarrier pilot synthesizer as by an upper sideband (FIG. 2) single-sideband suppressed carrier modulator at 9' (double the pilot tone 15.75 KHz for black and white transmission and 15.734 KHz for color).

A further encoder output is applied at 8''' to the voltage-controlled rf attenuator 10, which is the only circuit associated with the direct signal path. The attenuator design, according to a preferred feature of the invention, is essentially passive and is virtually linear; embodying, in an actual circuit successfully operated for the purposes of the invention, an FET chopper as the only active element, serving as a linear switched conductance.

In accordance with the invention the essential function of the picture encoder (which, in an actual transmitter, will perform the very same function), is to modulate the vertical sync interval, producing the two-dimensional field raster upon which the picture information is displayed, in such a manner as to produce a pattern of a plurality of successive normal fields (preferably three), followed by a plurality (preferably an equal plurality) of successive fields with the vertical sync depressed to blanking level (again, preferably three). The effect on a conventional television receiver receiving the ultimate scrambled transmission from either the "off the air" signal or an on the air transmission, is a substantial vertical shifting or rocking of the displayed raster picture at about a 10Hz rate, which produces psychological discomfort and unpleasantness to the viewer.

The final composite encoded signal (whether of the "off the air" or actual transmitter form), is produced by the linear addition of the thusly encoded picture carrier with the encoded aural carrier, the latter being shown developed by the application of the aural encoder composite baseband modulation output at 6' to an aural generator or transmitter circuit 11, which is thus modulated and which replaces the "off the air" channel 4 sound carrier removed by the traps 4. (A further 10 Hz square wave may be derived from the video encoder and modulated as the aural carrier to function as a keying signal for the video decoder at the receiver, where precise sync restoration is to be accomplished.) The two-port rf adder 12 thus receives the encoded picture carrier output along 10' and the encoded aural carrier at 11'. For the before-mentioned test, closed-system, demonstration and other purposes, a further channel 4 band-pass filter 13 may be employed to assure a final encoded signal, free of spurious emissions.

The invention is shown applicable both to the preferred over-the-air application and to cable uses, as well; with the encoded rf output illustrated in solid lines as connected by a coaxial cable 14 to the input amplifier 20 of the receiver, and by the dotted line connections via, for example, UHF transmitter 14' and transmitting antenna 14'', through the air, to receiving antenna 20'' and UHF-to-VHF converter system 20'. The over-the-air operation is preferred, however, since only the air link introduces any distortion, as compared with the large number of possible technical problems in conventional cable television systems.

Turning, now, to the receiver and its decoding operation, the picture decoder operates solely on sync information and, as in the case of the encoder, in no way alters the video content of the televised signal. The 10 Hz picture decode signal, before-mentioned, is derived from an aural decoder 26, and is applied to a sync processing picture decoder 28 operating with a voltage-controlled rf attenuator circuit 30, in a manner essentially inverse to the encoder circuits 8, 10, etc.

The necessary encoding signals and sync information are extracted from the composite channel suitably to restore the vertical sync interval for proper decoding. The restored video portion is now processed by splitting it into two paths at the splitter 22. One path 22' drives a low-distortion broadband frequency modulation receiver 21 which extracts all of the aural information including program sound, barker channel and the necessary coding tones. The other path 22'' is processed by means of a sound trap 24 removing all vestige of aural information. The output of the receiver 21 is suitably de-multiplexed into the raw composite baseband information. The appropriate audio channel, either the barker channel or the program channel, is selected by switch S for remodulation back to the required aural carrier in a local generator 23. This is added to the picture carrier which has previously been devoided of sound by the trap 24, to generate a composite channel in the adder output 32. Choice of barker or program audio appearing in the new composite channel is a function of whether the decoder is in the scrambled mode or decode mode as determined by S–S'. In addition to the automatic selection of the appropriate audio component as processed by the television receiver, the barker channel may always be made available in the decoder module by means of a self-contained speaker L, FIGS. 1 and 3. The barker channel, moreover, is normally available to all conventional television receivers without a decoder since the modulation spectrum falls directly within the 50 Hz–15 KHz audio passband. The aural decoder 26, however, as before explained, regenerates the barker channel via the local aural carrier generator 23 in view of the trapping in the encoder.

The effect of the two simultaneous sound signals provides for several unique features, in that it enables potential stereo sound transmission, or bilingual or translation transmission suitable for educational and other purposes, all in addition to possible continuous supplemental commentary to the main program information.

Each transmitted subscription program, moreover, has associated with it coding signals (billing tone generator 7 in the transmitter and decoder 27 in the receiver) necessary for the business function of subscriber billing. The format of the coding may assume a wide variety of forms such as, for example, a five-dimensioned sequence, the first two digits of which may identify the month and the year and the remaining three digits of which may identify in sequential order the number of the programs within that month, thus providing a capacity of 999 programs per month. The program code from the billing tone generator 7 is continuously transmitted for the duration of each program, ensuring that the subscriber may at any time during the course of each program activate his decoder and be suitably billed. The manner of processing and storing the billing code in the decoder may again assume a wide variety of forms, such as a tape-strip cassette recorder and suitable electronics R, a printer, punched ticket or tape, or other well-known device.

A monthly cassette, for example, may be mailed to each subscriber. The cassette, when inserted into its recorder R may have a header or code identifying the subscriber's account number. Each and every time the subscriber elects to activate his decoder for the purpose of watching a particular program, that program's unique code will automatically be recorded onto the cassette in such a manner that the succession of billings will represent an ascending order of code numbers. Since the manner of recording each individual subscription code is increased, there will be no gaps in unused tape segments between adjacent program subscription codes. At the end of the monthly billing period, a special code namely "EOT" (end of tape) may be automatically recorded on the tape upon commencement of tape ejection.

The circuit concept of the invention, as before stated, enables ready use with other recorders having other recording strip media, including "real time" tickets generated at the decoder by an integral strip printer which delivers a ticket strip marked with the identification number of the program and the price; or coin, prepaid tickets or facsimile recorders, and the like. The customer may mail in the ticket or tape strip or cassette or the like with the payment every month.

In the previously described actual transmitter operation, the system may assume the form shown in FIG. 3, where the reference numerals describe the same circuits and elements similarly identified in FIG. 1. Thus, the present invention, at the transmitter, scrambles or encodes the picture signals of the program by altering the vertical synchronizing pulses to cause the picture at the home or other receiving set repetitively to shift by rolling, in this case vertically, at about 10 cycles per second, making it very unpleasant, if not impossible, to view for any length of time. The program sound is displaced on a subcarrier, leaving the regular sound channel (barker) available for announcements to the potential program purchaser or other suitable use. At the subscription television (STV) customer's home, the received signal is connected by the decoder, activated by a single button switch, that restores the original signal with full quality. The barker audio may be heard at all times or at will from the small speaker L located in the decoder without the necessity of operating the television set. A myriad of recording techniques for billing may be readily used with the system, as before described.

In actual demonstration operation, a satisfactory system employed the aural baseband spectrum illustrated in FIG. 2, with the barker channel occupying the original 50 Hz–10 KHz aural or audio program location; a 15.75 KHz pilot tone (15.734 KHz for color); ± 3KHz side-banded 23.625 KHz picture, billing and verification code carrier (23.601 KHz for color); and the program audio on a 31.5 KHz suppressed carrier (31.469 KHz for color), twice the horizontal sync frequency. The channel amplifiers of FIG. 1 that were used were Type BT-1114 of Blonder-Tongue Laboratories of New Jersey; the RF splitters, two-port adders and sound traps were of Type BT-4534 and 4505; and the aural transmitter of Hewlett Packard Type M 202B FM signal generator. Clearly the types of sync processors, baseband multiplexers, attenuators, tone generators, etc. employed in the systems of the previously mentioned U.S. Letters Patents and in said assignee's reply to FCC Memo 6110/T85.13 may be used, as well as other similar well-known circuits for these functions. In addition, while sync processing is effected at 8 and 10 upon the vertical sync, it may also be applied to the horizontal sync together with the vertical sync, or, in some cases, alone, though this is not considered as effective. Further modifications will also occur to those skilled in this art and all such are considered to fall within the spirit and scope of the invention as defined in the appended claims.

What is claimed is:

1. A method of scrambling, encoding and decoding television signals that contain horizontal and vertical synchronizing signals for developing a raster, video picture signal information for display upon the raster, and accompanying aural signal information, the method comprising, picture-scrambling the television signals by modulating at least one of the horizontal and vertical synchronizing signals to produce repetitively a plurality of normal-level successive synchronizing signals followed by a plurality of such synchronizing signals attenuated and thus depressed to substantially blanking level, but without affecting and altering the video signal information; adjusting the rate of such repetitive synchronizing-signal modulation to a value that produces psychological discomfort to a viewer of the resulting shifting television picture on a normal receiver; encoding the aural signal information to render the same unintelligible at a normal receiver; transmitting the thusly picture-scrambled and aural-encoded television signals and receiving the same; decoding the aural signal information to recover the same; and reversely attenuating and amplifying the plurality of depressed-level synchronizing signals to restore the same to normal level and thus stop the repetitive television picture shifting and without change in picture reception quality over that obtained in unscrambled transmission and reception.

2. A method as claimed in claim 1 and in which said aural signal encoding comprises shifting the aural signal information from its normal band to a superaudible subcarrier.

3. A method as claimed in claim 2 and in which the further step is performed of transmitting other aural information in the said normal aural signal band.

4. A method as claimed in claim 3 and in which said transmitting of other aural information comprises, simultaneously with said television signal transmission, transmitting aural barker information, and receiving the same even in the absence of reception of said television signals.

5. A method as claimed in claim 3 and in which said adjusting is effected at a rate of substantially 10 Hz.

6. A method as claimed in claim 3 and in which said modulating is effected upon the said vertical synchronizing signals.

7. A method as claimed in claim 6 and in which said modulating is also effected simultaneously upon the said horizontal synchronizing signals.

8. A method as claimed in claim 6 and in which each of said pluralities of normal-level and attenuated and depressed-level synchronizing signals contain substantially equal numbers of said signals.

9. A method as claimed in claim 8 and in which each of said pluralities contains three successive synchronizing signals.

10. A method as claimed in claim 3 and in which said modulating is effected upon the said horizontal synchronizing signals.

11. A method as claimed in claim 1 and in which each of said pluralities of normal-level and attenuated and depressed-level synchronizing signals contain equal numbers of such signals.

12. A method as claimed in claim 11 and in which said number of such signals is substantially three.

13. A method as claimed in claim 2 and in which said subcarrier is adjusted to a value substantially twice the frequency of the said horizontal synchronizing signals.

14. A method as claimed in claim 1 and in which said transmitting and receiving steps include simultaneously transmitting and receiving billing signals representative of the identification and duration of the transmitted scrambled and encoded programs, and the further step is performed of recording the time of the receiving decoding to enable such billing in accordance with the receiver usage.

15. A method as claimed in claim 14 and in which, during said transmitting, the billing signals will be sent in ascending coded order for successive programs transmitted during the month.

16. A method as claimed in claim 15 and in which said coded order includes digits representing date and the assigned number of the transmitted program.

17. A method as claimed in claim 1 and in which said transmitting and receiving is effected over at least one of over-the-air and cable paths.

18. A method as claimed in claim 1 and in which, prior to such scrambling and encoding, the television signals are produced by receiving and processing television signals received from another transmission.

19. A method of scrambling and encoding television signals that contain horizontal and vertical synchronizing signals for developing a raster, video, picture signal information for display upon the raster, and accompanying aural signal information, the method comprising, picture-scrambling the television signals by modulating at least one of the horizontal and vertical synchronizing signals to produce repetitively a plurality of normal-level successive synchronizing signals followed by a plurality of such synchronizing signals attenuated and thus depressed to substantially blanking level, but without affecting and altering the video signal information; adjusting the rate of such repetitive synchronizing-signal modulation to a value that produces psychological discomfort to a viewer of the resulting shifting television picture on a normal receiver; encoding the aural signal information to render the same unintelligible at a normal receiver; and transmitting for reception the thusly picture-scrambled and aural-encoded television signals.

20. A method as claimed in claim 19 and in which said aural signal encoding comprises shifting the aural signal information from its normal band to a superaudible subcarrier.

21. A method as claimed in claim 20 and in which the further step is performed of simultaneously transmitting other aural information such as an aural barker and the like in the said normal aural signal band.

22. A method as claimed in claim 19 and in which said adjusting is effected at a rate of substantially 10 Hz.

23. A method as claimed in claim 19 and in which said modulating is effected upon the said vertical synchronizing signals.

24. A method as claimed in claim 23 and in which each of said pluralities of normal-level and attenuated and depressed-level synchronizing signals contain substantially equal numbers of said signals.

25. A method as claimed in claim 24 and in which said number of such signals is substantially three.

26. A method as claimed in claim 20 and in which said subcarrier is adjusted to a value substantially twice the frequency of said horizontal synchronizing signals.

27. A method as claimed in claim 19 and in which said transmitting step includes simultaneously transmitting billing signals representative of the identification and duration of the transmitted scrambled and encoded programs.

28. A method of unscrambling and decoding scrambled and encoded television signals that contain horizontal and vertical synchronizing signals for developing a raster, video-picture signal information for display upon the raster, and accompanying aural signal information, and in which the scrambling and encoding comprises a modulation of at least one of the horizontal and vertical synchronizing signals to produce repetitively a plurality of normal-level successive such synchronizing signals followed by a plurality of such synchronizing signals attenuated and thus depressed to substantially blanking level, but without affecting and altering the video-signal information, with the rate of such repetitive modulation adjusted to a value that produces psychological discomfort to a viewer of the resulting shifting television picture on a normal receiver, and an encoded aural signal; the said method comprising receiving the scrambled and encoded television signals; decoding the aural signal information to recover the same; and reversely attenuating and amplifying the plurality of depressed-level synchronizing signals to restore the same to normal level and thus stop the repetitive television picture shifting and without change in picture reception quality over that obtained in unscrambled transmission and reception.

29. A method as claimed in claim 28 and in which said aural signal encoding comprises shifting the aural signal information from its normal band to a superaudible subcarrier, and further aural information such as an aural barker and the like is transmitted simultaneously in said normal band; said method including the further steps of receiving said barker and the like even in the absence of said decoding, and decoding said aural signal information from said subcarrier audibly to reproduce the television signal aural signal information simultaneously with said reverse attenuating and amplifying of the modulated synchronizing signals during the picture restoration.

30. A method as claimed in claim 28 and in which billing signals representative of the identification and duration of transmitted scrambled and encoded programs are simultaneously transmitted; said method including the further steps of receiving said billing signals simultaneously with said decoding; and recording the time of the decoding to enable such billing in accordance with the receiver usage.

31. Scrambled and encoded television signal apparatus having, in combination, means for producing television signals comprising horizontal and vertical synchronizing signals for developing a raster, video picture signal information for display upon the raster, and accompanying aural signal information; synchronizing signal modulating means operative for at least one of said synchronizing signals and comprising voltage-controlled attenuator means for repetitively attenuating and depressing to blanking level a plurality of successive of such synchronizing signals, following a plurality of normal-level successive synchronizing signals, but without affecting and altering the video picture signal information, said modulating means being adjusted to set the rate of such repetitive modulation to a value that produces psychological discomfort to a viewer of the resulting shifting television picture on a normal receiver; encoding means for rendering said aural signal information unintelligible at a normal receiver; means for transmitting the thusly picture-scrambled and aural-encoded television signals; means for receiving the same; decoding means for recovering said aural signal information; and means comprising a further voltage-controlled attenuator and amplifying means operated reversely to the first-named attenuator means to restore the depressed-level synchronizing signals to normal level and thus stop the repetitive television picture shifting, and without change in picture reception quality over that obtained in unscrambled transmission and reception.

32. Apparatus as claimed in claim 31 and in which said aural signal information encoding means comprises baseband multiplexer means for shifting said aural signal information from its normal band to a superaudible subcarrier; and said decoding means comprises fm aural receiver and baseband demultiplexer means for recovering the aural signal information during the television picture restoration.

33. Apparatus as claimed in claim 32 and in which the baseband multiplexer means comprises suppressed carrier modulator means for producing said subcarrier at a frequency substantially two times that of the horizontal synchronizing signal frequency.

34. Apparatus as claimed in claim 32 and in which means is provided for transmitting simultaneously with said subcarrier, further aural signals, such as a barker channel and the like, in said normal band.

35. Apparatus as claimed in claim 34 and in which composite aural baseband signal combining means is provided producing a composite baseband comprising said subcarrier modulated by said aural signal information of the television signals and said barker channel.

36. Apparatus as claimed in claim 35 and in which pilot-tone producing means is provided for producing a frequency corresponding substantially to the horizontal synchronizing signal frequency and connected with said baseband signal combining means.

37. Apparatus as claimed in claim 35 and in which means is further provided for producing video decoding and billing and verification code tones and applying the same to said baseband signal combining means.

38. Apparatus as claimed in claim 31 and in which said one of said synchronizing signals is the vertical synchronizing signals.

39. Apparatus as claimed in claim 38 and in which each of said pluralities of normal-level and blankinglevel signals is substantially equal in number of such signals.

40. Apparatus as claimed in claim 39 and in which said number is substantially three.

41. Apparatus as claimed in claim 31 and in which said repetitive modulation rate is substantially 10 Hz.

42. Apparatus as claimed in claim 31 and in which said modulating voltage-controlled attenuator means comprises radio-frequency attenuating means connected with sync processing picture encoder means and radio-frequency video signal information supplying means.

43. Apparatus as claimed in claim 31 and in which said further voltage-controlled attenuator means comprises radio-frequency attenuating and amplifying means connected with sync processing picture decoding means and radio-frequency video signal information receiving means.

44. Apparatus as claimed in claim 32 and in which said further attenuator means is connected along two paths; one to said aural receiver, and the other through sound trap means to radio-frequency adder means for connection to normal television receiver means.

45. Apparatus as claimed in claim 44 and in which said baseband demultiplexer means connects alternately and selectively for decoder aural signal information and barker channel and the like, with local aural carrier generator means, the last-named means in turn being connected with said adder means.

46. Apparatus as claimed in claim 44 and in which billing tone decoding and recording means is provided connected to said baseband demultiplexing means and to selective decode switching means.

47. Scrambled and encoded television signal decoding and unscrambling apparatus for use with television signals that contain horizontal and vertical synchronizing signals for developing a raster, video picture signal information for display upon the raster, and accompanying aural signal information, and in which the scrambling and encoding comprises a modulation of at least one of the horizontal and vertical synchronizing signals to produce repetitively a plurality of normal-level successive such synchronizing signals followed by a plurality of such synchronizing signals attenuated and thus depressed to substantially blanking level, but without affecting and altering the video signal information, with the rate of such repetitive modulation adjusted to a value that produces psychological discomfort to a viewer of the resulting shifting television picture on a normal receiver, and an encoded aural signal; the said apparatus having, in combination, means for receiving the scrambled and encoded television signals; decoding means for recovering said aural signal information; and means comprising voltage-controlled attenuator and amplifying means operating reversely to said depressed level modulation to restore the depressed-level synchronizing signals to normal level and thus stop the repetitive television picture shifting, and without change in picture reception quality over that obtained in unscrambled transmission and reception.

48. Apparatus as claimed in claim 47 and in which said encoded aural signal information comprises shifting said aural signal information from its normal band to a super-audible subcarrier, and said apparatus further contains in its said decoding means, fm aural receiver and baseband demultiplexer means for recovering the aural signal information during the television picture restoration.

49. Apparatus as claimed in claim 47 and in which there is transmitted simultaneously with said television signals further aural signals, such as a barker channel and the like, in said normal band; and said apparatus further comprises means for receiving and indicating said further aural signals irrespective of decoding of the television signals.

50. Apparatus as claimed in claim 47 and in which said voltage-controlled attenuator and amplifying means comprises radio-frequency attenuating and amplifying means connected with sync processing picture decoding means and radio-frequency video signal information receiving means.

51. Apparatus as claimed in claim 48 and in which said voltage-controlled attenuator and amplifying means is connected along two paths; one to said aural receiver, and the other through sound trap means to radio-frequency adder means for connection to normal television receiver means.

52. Apparatus as claimed in claim 51 and in which said baseband demultiplexer means connects alternatively and selectively for decoded aural signal information and barker channel and the like, with local aural carrier generator means, the last-named means in turn being connected with said adder means.

53. Apparatus as claimed in claim 51 and in which billing tone decoding and recording means is provided connected to said baseband demultiplexing means and to selective decode switching means.

* * * * *